Jan. 5, 1932.　　　F. H. LANG ET AL　　　1,839,972
DISPLAY DEVICE
Filed Aug. 1, 1929
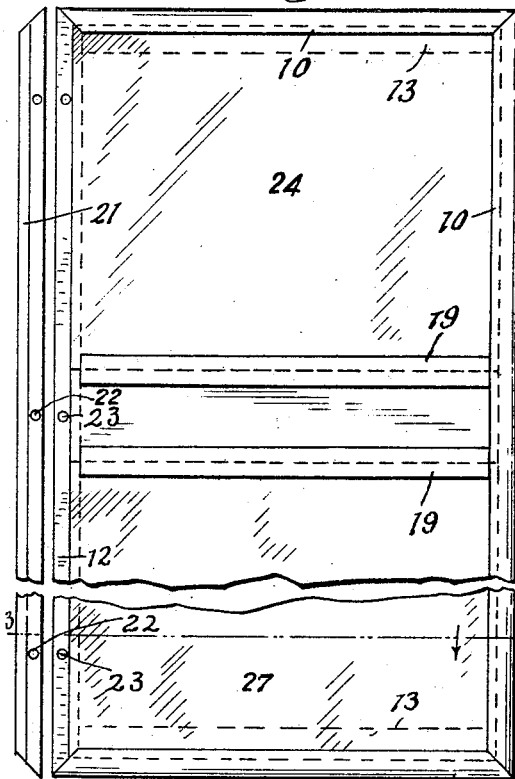
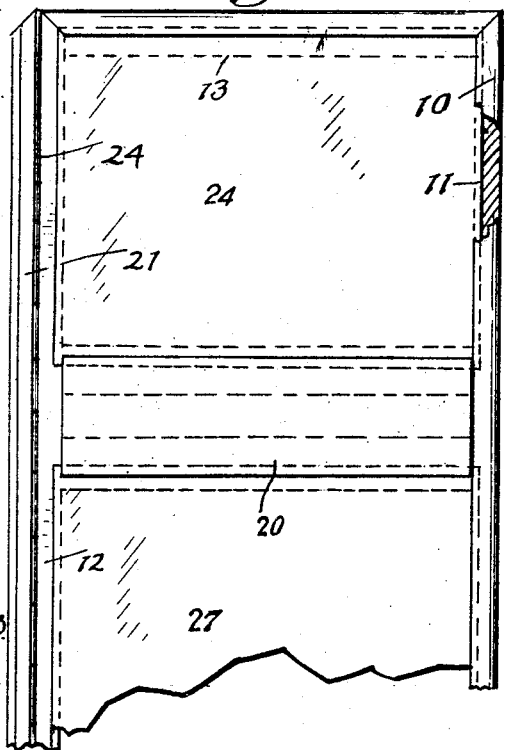
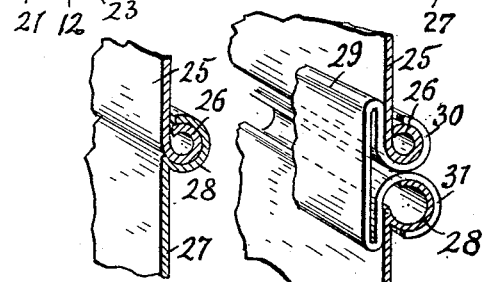
Inventors
Frederic H. Lang
Nathan E. Van Stone
Kwis Hudson & Kent
attys Patented Jan. 5, 1932

1,839,972

UNITED STATES PATENT OFFICE

FREDERIC H. LANG AND NATHAN E. VAN STONE, OF CHICAGO, ILLINOIS, ASSIGNORS TO THE SHERWIN-WILLIAMS COMPANY, OF CLEVELAND, OHIO, A CORPORATION OF OHIO

DISPLAY DEVICE

Application filed August 1, 1929. Serial No. 382,757.

This invention relates to a display device, and more particularly to a device for displaying the effect of finishing an object or structure in various colors or color combinations. The invention will be described with reference to a device for displaying the effect of finishing automobile bodies in various colors or color combinations, but it should be understood that the utility of the device is not limited to this particular application, since it could be used advantageously for displaying the effect of different colors or color combinations to be employed in the finishing of any structure or article, such as an automobile body, railway coach, airplane or building.

An object of the invention is to provide a device whereby any number of different colors or color combinations may be displayed in substantially the same form and manner of arrangement in which it is proposed to finish a structure or article, with the result that the prospective purchaser may readily ascertain the desirable color schemes or combinations.

Another object is to provide a device of this character wherein the changes from one color or color combination to any other color or color combination may be readily and quickly accomplished.

Additional objects and advantages will become apparent hereinafter.

Certain embodiments of the invention are illustrated in the accompanying drawings wherein—

Fig. 1 is a front elevational view of one form;

Fig. 2 is a fragmentary front elevation of a slightly modified form of the device;

Fig. 3 is a sectional view taken substantially on line 3—3 of Fig. 1 looking in the direction of the arrows;

Fig. 4 is a fragmentary perspective detail of one manner of connecting the panels; and Fig. 5 is a similar view illustrating another manner of connecting the panels.

In the drawings, the device illustrated is particularly useful for displaying the effect of various colors or color combinations with which it is proposed to finish automobile bodies, since such device may represent a door, a quarter panel, a tonneau panel, or any other part of the exterior surface of the automobile body. In the specific instance it is proposed to have the device constructed so that various colors or color combinations, with which an automobile body may be finished, can be conveniently and quickly displayed to a proposed purchaser, and particularly to the purchasing or designing departments of automobile body manufacturers and to customers of refinishing shops.

In the forms shown a frame is provided which may be of the full size of the average automobile door, panel or section, or, if desired, for the purposes of convenience, it may be reduced in size. This frame is formed at its top and bottom and on one side edge of strips 10, of any desirable material, suitably connected at their meeting ends and provided throughout their lengths with a groove 11 extending inwardly from the inner side of each strip. The other longitudinal edge of the frame is formed of a flat strip 12 suitably connected with the end strips 10 and having its upper surface in alignment with one side of the grooves 11 in the strips 10. It should be stated at this time that although the strips 10 have been described as being integral, they could each equally as well be formed of a plurality of strips joined together so as to provide a groove between their adjacent surfaces extending inwardly from the inner side of the strips. It should also be noted that the two end strips are provided with portions 13 extending inwardly of the frame from the groove 11 so as to form a better support for the panels of different colors which are arranged in the frame as will be described hereinafter.

In Fig. 1, there is shown an arrangement of panels of various colors, these panels being indicated by the numerals 24, 25 and 27. The meeting edges of these panels are preferably formed with beads such as those indicated at 26 and 28 in Figs. 4 and 5. According to this construction the bead 26 is adapted to be telescoped with the bead 28, as shown in Fig. 5, or a strip 29, simulating a molding, may be combined with the panels as shown in Fig. 4. The strip 29 is provided with beads, as indicated at 30 and 31, to telescope with the beads 26 and 28, respectively.

The panels 24, 25 and 27 may be displayed with or without the frame, above described, and when the frame is not used the connections between the panels, as illustrated in Figs. 4 and 5, will retain them in any relation in which they are assembled. It will be understood that in order to permit different relative arrangements of the several panels, the meeting edges of the panels 24 and 25 will be provided with beads similar to the beads 26 and 28 so that, when desired, the panel 24 may be connected directly to the panel 27, in the manner illustrated in Fig. 5, or the strip 29 may be used to connect the panels 24 and 27. In some instances it may be desired to show the effect of a relatively broad molding or band between the panels 24 and 27 and this arrangement is illustrated in Fig. 2 wherein the strip 20 is used in place of the panel 25. It will be understood that upper and lower edges of the strip 20 will be provided with beads similar to the beads 30 and 31 on the strip 29.

When the panels are used with the above described frame the edges of the panels are positioned in the grooves 11 and a retaining strip 21 is positioned on the strip 12 and held thereon by a number of dowel pins 22 which engage holes 23 in the strip 12.

In Fig. 2 the retaining strip 21 is shown as connected to the flat strip 12 by means of a piano hinge 24, in which case it is merely necessary to fold the strip over upon the flat strip 12, suitable means being provided, if desired, to hold the strip in such position.

From the foregoing description the advantages of the invention will become apparent. It is clear that a display device thus constructed presents a novel and easy way of displaying new colors and different color combinations to the public, and especially the proposed color combinations for automobile bodies to the purchasing agents and designing engineers of automobile or automobile body manufacturers or concerns which build airplanes, railway coaches and other structures. It is not necessary for the salesman to carry with him a number of model doors, panels or sections showing different color combinations, since the one frame can be used with any number of differently colored panels to show any proposed or suggested color combination. Because of this, the frame may be made full size, and, therefore, the colored panels supported in the frame will more accurately and clearly give the finished effect of an automobile body finished in the different color combinations. Not only will the device have particular utility in displaying color combinations to large purchasers, but it also has utility in re-paint shops to display to prospective customers the effect of different color combinations. It should be understood that when it is desired to have the frame represent an automobile door that the upper panel may be omitted to provide the window.

Although certain embodiments of the invention have been illustrated and described herein, it is not intended to limit the invention thereto, except insofar as the scope of the appended claims so limits it.

Having thus described our invention, we claim:

1. A display device of the character described comprising a display surface presented by upper and lower colored panels having opposed curled adjacent edges, and an intermediate colored panel comprising a part of the display surface for detachably securing said panels together, said intermediate panel having opposite edge portions bent inwardly to overlie the adjacent edges of said upper and lower panels on the display surface and curled outwardly around the curled edges of the upper and lower panels to detachably secure said panels together.

2. A display device comprising a pair of spaced, colored, interchangeable panels comprising a part of the display surface, an intermediate panel also forming a part of the display surface simulating a raised portion of an automobile body having inwardly bent flanges reversed upon themselves to provide longitudinal grooves into which adjacent edges of the first mentioned panels extend.

3. A display device of the character described comprising a display surface presented by upper and lower colored panels having opposed curled edges, and an intermediate panel comprising a part of the display surface, said intermediate panel having opposite edge portions encircling said curled edges and serving to unite the display surfaces and said first mentioned panels into a common display.

4. A display device of the character described comprising a display surface presented by upper and lower colored panels having opposed curled edges, and an intermediate panel lying in a plane with said first mentioned panels and comprising a part of the display surface, said intermediate panel having opposite edge portions encircling said curled edges and serving to unite the display surfaces and said first mentioned panels into a common display.

In testimony whereof, we hereunto affix our signatures.

FREDERIC H. LANG.
NATHAN E. VAN STONE.